(12) United States Patent
Berne

(10) Patent No.: US 10,604,083 B2
(45) Date of Patent: Mar. 31, 2020

(54) DEVICE AND METHOD FOR MOUNTING A CAMERA ON A VEHICLE

(71) Applicant: Volvo Truck Corporation, Göteborg (SE)

(72) Inventor: Nicolas Berne, Heyrieux (FR)

(73) Assignee: VOLVO TRUCK CORPORATION, Göteborg (SE)

(*) Notice: Subject to any disclaimer, the term of this patent is extended or adjusted under 35 U.S.C. 154(b) by 0 days.

(21) Appl. No.: 16/345,813

(22) PCT Filed: Nov. 25, 2016

(86) PCT No.: PCT/IB2016/001833
§ 371 (c)(1),
(2) Date: Apr. 29, 2019

(87) PCT Pub. No.: WO2018/096378
PCT Pub. Date: May 31, 2018

(65) Prior Publication Data
US 2019/0263331 A1 Aug. 29, 2019

(51) Int. Cl.
*B60R 11/04* (2006.01)
*G03B 17/56* (2006.01)
*B60R 11/00* (2006.01)

(52) U.S. Cl.
CPC ............ *B60R 11/04* (2013.01); *G03B 17/561* (2013.01); *B60R 2011/0003* (2013.01);
(Continued)

(58) Field of Classification Search
CPC ...................................................... B60R 11/04
See application file for complete search history.

(56) References Cited

U.S. PATENT DOCUMENTS 7,825,951 B2 * 11/2010 Lang .................... B60R 1/12
340/438
8,896,698 B2 * 11/2014 Brester .................. B60R 11/04
296/181.5
(Continued)

FOREIGN PATENT DOCUMENTS

CN 103672236 A 3/2014
DE 102012015395 B3 11/2013
(Continued)

OTHER PUBLICATIONS

International Search Report and Written Opinion for International Patent Application No. PCT/IB2016/001833, dated Mar. 28, 2017, 13 pages.

*Primary Examiner* — Clayton E. LaBalle
*Assistant Examiner* — Leon W Rhodes, Jr.
(74) *Attorney, Agent, or Firm* — Withrow & Terranova, PLLC

(57) ABSTRACT

The invention relates to a device/method for mounting a camera to a vehicle. The device comprises a mount (11), the mount having a tubular body. The mount comprises a first portion (12a) and a second portion (12b), the first portion having a first outer diameter and the second portion having a second outer diameter which is smaller than the first outer diameter; and a securing member (18b). The tubular body extends through an aperture in a panel (20) of a vehicle, the panel having an interior and an exterior surface. Accordingly, in use the first portion of the tubular body extends away from the exterior surface of the panel, and the second portion of the tubular body extends through the aperture of the panel and away from the interior surface of the panel. The first portion of the tubular body receives the securing member and the securing member extends through the first portion of the tubular body to engage the panel from the
(Continued)

exterior surface side. Advantageously the mount is attached to the panel from the exterior side.

19 Claims, 3 Drawing Sheets

(52) U.S. Cl.
CPC ... *B60R 2011/004* (2013.01); *B60R 2011/008* (2013.01); *B60R 2011/0052* (2013.01); *B60R 2011/0082* (2013.01)

(56) References Cited

U.S. PATENT DOCUMENTS

| | | | | |
|---|---|---|---|---|
| 9,205,785 | B2* | 12/2015 | Squire | B60R 11/04 |
| 9,593,843 | B2* | 3/2017 | McRory | H04N 7/185 |
| 2014/0247353 | A1* | 9/2014 | Lang | B60R 1/0605 |
| | | | | 348/148 |

FOREIGN PATENT DOCUMENTS

| | | |
|---|---|---|
| EP | 0775865 A1 | 5/1997 |
| WO | 2013118346 A1 | 8/2013 |

\* cited by examiner

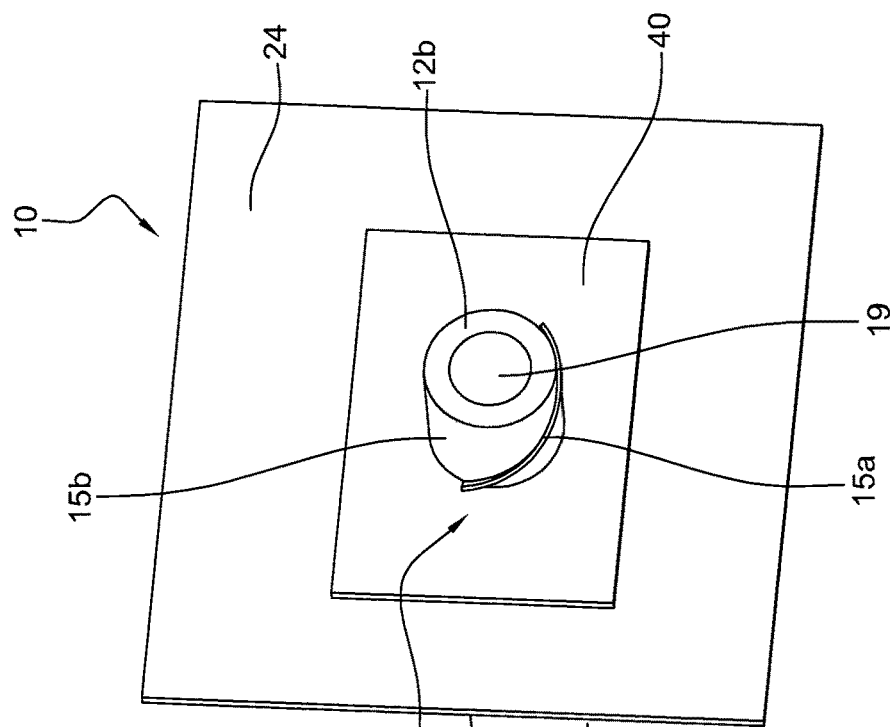
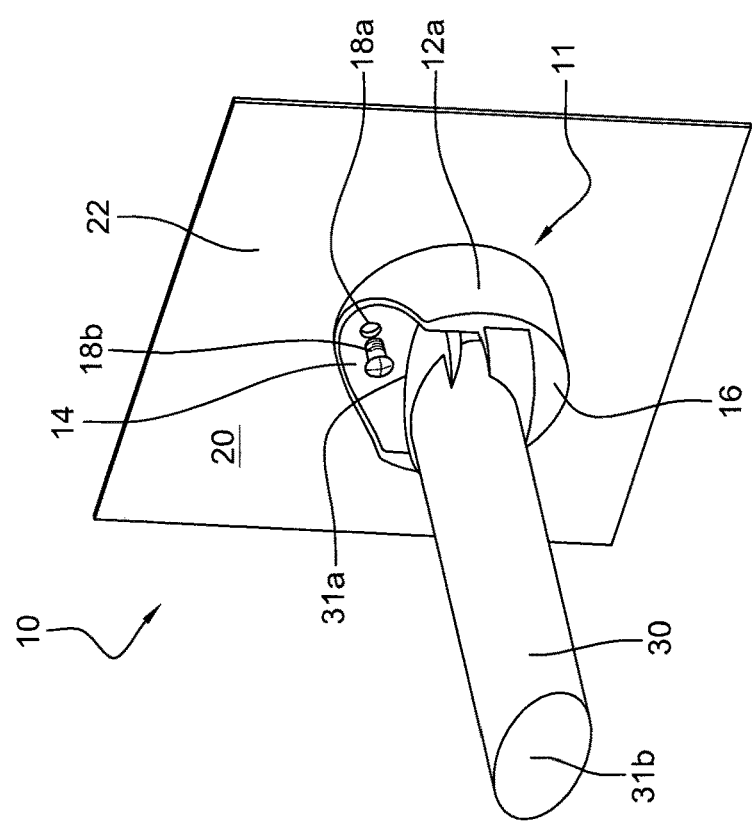
Fig. 1a
Fig. 1b

DEVICE AND METHOD FOR MOUNTING A CAMERA ON A VEHICLE This application is a 35 USC § 371 national phase filing of International Application No. PCT/IB2016/001833, filed Nov. 25, 2016, the disclosure of which is incorporated herein by reference in its entirety.

TECHNICAL FIELD

The invention relates to an apparatus for mounting a camera to a vehicle, and a method of mounting a camera to a vehicle.

The invention can be applied in heavy-duty vehicles, such as trucks, buses and construction equipment. Although the invention will be described with respect to a truck, the invention is not restricted to this particular vehicle, but may also be used in other vehicles such as a car, bus or working machines (such as farm machinery).

BACKGROUND

Blind spots are areas around the vehicle which sit outside of the driver's field of view, that is they are not within the driver's direct view. In particular, larger vehicles, such as trucks and buses, have substantial blind spots which make manoeuvring the vehicle both difficult and dangerous. For example, manoeuvers such as reversing, turning and changing lanes are highly dangerous because the driver's field of view to the side and the rear of the truck is limited.

Areas around the truck which cannot be directly observed by the driver must be viewed indirectly and many large vehicles are now legally required to have both wide angle and close proximity side mirrors fitted which expand the driver's field of vision around the vehicle. Close proximity mirrors help to make nearside turns, such as at roundabouts and junctions, less hazardous.

Even with such mirrors fitted however, blind spots are not completely eradicated, and unfortunately they can still exist at the sides of the truck, particularly next to the near-side wheel, and also behind the truck.

One solution to minimise blind spots is to mount camera-systems using external cameras connected to monitors within the vehicle. In particular this may be advantageous for larger vehicles, such as at the sides and the rear of a truck. Revised legislation is now being introduced which will allow camera-monitors to be used in place of or in addition to conventional mirrors. Some camera-systems may also provide the benefit of having smaller external features compared to conventional mirrors. Advantageously, this can can help to reduce, for example, the drag experienced by the vehicle or noise generated when the camera-systems are used in place of the conventional mirrors.

By way of example, to cover the blind spot at the rear of a truck, rear view cameras can be mounted at the back end of the vehicle and the image produced is fed to a monitor mounted within the cab of the vehicle in the direct view of the driver. This gives the driver a clear view of the rear of the truck, thus making manoeuvers such as reversing much safer.

SUMMARY

An object of the invention is to provide an improved apparatus and method for attaching a camera-monitor to a vehicle, particularly to the side of a vehicle.

According to a first aspect, the object is achieved by provides a vehicle camera mounting apparatus as according to claim 1.

According to a second aspect, the object is achieved by provides a vehicle camera mounting apparatus as according to claim 16.

According to a third aspect the object is achieved by the method for mounting a camera to a vehicle as claimed in claim 17.

The tubular body is typically cylindrical in shape. The tubular body may however be any other suitable shape, such as cuboid.

The first outer diameter may be from 1.1 to 3 times greater than the second outer diameter. The first outer diameter may be twice the length of the second outer diameter. For example, the second outer diameter may be 3 cm and the first outer diameter may be 6 cm. The size of the first and the second outer diameters may be dependent on the dimensions and weight of the camera to be mounted to the vehicle. The size of the first and the second outer diameters may also be dependent on the dimensions of the vehicle to which the camera is to be mounted.

The first portion of the tubular body normally remains outside of the vehicle, even in use, and the second portion of the tubular body may cross the panel of the vehicle and extend into the inside of the vehicle.

A hollow passage may extend through both the first portion and the second portion of the tubular body. The hollow passage is typically continuous between the first portion and the second portion. The hollow passage may be uniform along the length of the passage. The first portion and the second portion may have the same inner diameter. In some embodiments the first portion and the second portion may have different inner diameters.

The hollow passage may allow access to the interior of the vehicle from the exterior of the vehicle. It may be an advantage of embodiments of the present invention that the hollow passage allows access to the interior of the vehicle from the exterior of the vehicle, for example this may allow the passage of wires to or from the camera on the exterior of the vehicle for connection with the vehicle systems. For example, wires may extend through the hollow passage and pass beyond the panel to the interior of the vehicle where they may be attached, for example, to a monitor which the driver can view.

The first portion may comprise a first section and a second section. The first section may, for example, be a top section. The second section may, for example, be a bottom section. The top section is defined as being above the bottom section when the tubular body is attached to the panel. The second section may extend further from the exterior surface than the first section. The second section may be longer in length than the first section. The first section and the second section may be suitably shaped to support a camera housing. For example, the second, bottom, section may form a "seat" within which the camera housing may be supported.

The securing member may be a clip. The securing member may be a screw. The securing member may lock or attach the apparatus securely to the panel. The securing member may extend through the first (lesser extending) section to engage the panel from the exterior surface side, such that the first portion of the tubular body is attached to the panel.

The second portion of the tubular body may comprise an outer surface. The second portion of the tubular body may comprise at least one rib extending radially from the outer surface. The at least one rib may extend helically along the outer surface. Alternatively, the at least one rib may extend linearly along the outer surface of the second portion in a direction which is parallel to the axis of the tubular body. The number of ribs may vary depending on the dimensions and weight of the camera to be mounted to the vehicle. The number of turns of the helix, that is the number of turns around the axis of the helix, may be selected depending on the dimensions and weight of the camera to be mounted to the vehicle.

The aperture of the panel may comprise at least one complementary recess or slot. The at least one complementary recess may be shaped to match the surface shape of the at least one rib. The at least one rib may be configured to be mateable with the at least one complementary recess of the aperture of the panel. The at least one complementary recess may act as a keyway. For example, the at least one rib has a square shaped surface and the at least one complementary recess also has a matching square shape to allow the rib to mate with the recess.

In some embodiments, the at least one rib may be continuous with the first portion of the tubular body. The at least one rib may be in contact with the first portion of the tubular body. In alternative embodiments, the at least one rib may be discontinuous with the first portion. For example, there may be a gap between the at least one rib and the first portion of the tubular body. The axial length of the gap may be equal to the width/thickness of the panel (which may include any reinforcing member provided on/with the panel at the location of the aperture). It may be an advantage of embodiments of the present invention that the at least one rib is continuous with the first portion of the tubular body and that each rib has a complementary recess because the interlocking of the at least one rib and the at least one recess may help to prevent the rotation of the apparatus after it has been installed on the vehicle.

The at least one rib may be configured to be mateable with the at least one complementary recess of the aperture of the panel. The at least one complementary recess may act as a keyway. In the rotated position, an end of the at least one rib adjacent to the at least one recess and the at least one complementary recess may be offset and the tubular body may be attached to the panel. Compared to the first aspect, in the rotated position, the at least one rib and the at least one complementary recess secure the tubular body to the panel thus mitigating the need for a separate securing member, such as a screw. A separate securing member, such as a screw, may however still be used.

The at least one rib may have a surface which may be rounded or square shaped, or indeed any other suitable shape. The shape of the surface of the at least one rib may be uniform along the length of the at least one rib. Where there is more than one rib, such as more than one helical rib or more than one straight rib on the same tubular body, each rib may have the same surface shape or they may have a different surface shape. For example, each rib may have a square shaped surface, or one rib may have a rounded surface and another rib may have a square shaped surface.

In embodiments where the at least one rib is helical, the tubular body may inherently rotate when the at least one rib mates in use with the at least one complementary recess of the aperture of the panel. The tubular body may rotate through up to and including 90 degrees when the second portion is inserted through the aperture of the panel.

Since the outer diameter of the first portion is larger then the outer diameter of the second portion, the first portion of the tubular body may be arranged to provide a sealing surface that abuts the exterior surface of the panel adjacent to the aperture. As the first portion is larger in diameter than the second portion, the first portion may for example overlie the exterior surface of the panel adjacent to the aperture. The sealing surface may substantially surround the aperture when the apparatus is attached to the panel.

A seal arrangement, for example a gasket or a seal, may be provided between the exterior surface of the panel and the first portion of the tubular body. In particular, the seal may be provided between the sealing surface which abuts or overlies the exterior surface of the panel adjacent to the aperture. It may be an advantage of embodiments of the present invention that providing a seal allows the interior of the vehicle to remain sealed and waterproof without additional assembly steps. Providing a seal arrangement as part of the assembly may also mitigate the need for waterproofing the cables and connectors passing from the exterior of the vehicle to the interior of the vehicle via the hollow passage. This may, for example, help to minimise costs or complexity. Furthermore, providing a seal may also help with reducing noise levels within the vehicle.

The apparatus may further comprise an elongate camera housing. The elongate camera housing may be attached to the first portion of the tubular body. The top section and the bottom section of the first portion of the tubular body may be suitably shaped to support said camera housing. The camera housing may be moveable between an operable and a stowable position.

The camera housing may comprise a first end and a second end. The first end may be attached to the first portion of the tubular body. A perpendicular distance between the second end of the camera housing and the exterior surface of the panel may be varied in use. In the operable position, the perpendicular distance may be maximised. In the operable position, the camera housing may be configured to be perpendicular, or at least substantially perpendicular, to the panel to which the apparatus is attached. The camera housing may be supported by the bottom section. The angle of the camera housing may for example vary by +/−10 degrees and still be considered perpendicular to the exterior surface of the panel. In the operable position, the camera housing may be at an angle of from 45 to 135 degrees to the panel and may be supported by the bottom section.

In the stowable position, the perpendicular distance may be minimised. In the stowable position the camera housing may be configured to be parallel, or at least substantially parallel, to the panel to which the apparatus is attached. The camera housing may sit substantially flush against the top section.

The camera housing is typically moveable between the operable and stowable positions along a folding axis. The folding axis is preferably parallel to the plane of the panel of the vehicle.

The pitch of the camera housing may be varied, which in turn varies the pitch and field of view of a camera located within the housing. The pitch may be varied manually or electronically via a control system located within the cab of the vehicle.

The first portion of the tubular body may be substantially perpendicular to the exterior surface of the panel. The second portion of the tubular body may be substantially perpendicular to the interior surface of the panel. The angle of the first and/or second portions may for example vary by +/−10 degrees and still be considered perpendicular to the exterior and/or interior surface of the panel.

In some embodiments, the first portion and/or the second portion of the tubular body may be at an angle to the exterior and/or interior surface of the panel. In such embodiments, first portion and/or the second portion of the tubular body may be at an angle of from 45 to 135 degrees to the exterior and/or interior surface of the panel.

In the operable position, the camera housing may be at an angle to the exterior surface of the panel which is the same as, or at least substantially corresponds to, the angle of the first portion of the tubular body from the exterior surface of the panel. For example, in the operable position both the camera housing and the first portion of the tubular body may be substantially perpendicular to the exterior surface of the panel.

The apparatus may further comprise a reinforcement panel which is preferably attached to the interior surface of the panel of the vehicle. The reinforcement panel typically has an aperture which is aligned with the aperture of the panel of the vehicle. The aperture of the reinforcement panel may have the same profile as the aperture of the panel of the vehicle. Advantageously, the reinforcement panel may help to provide added strength to the panel of the vehicle. For example, a reinforcement panel may allow the panel of the vehicle to support heavier and/or larger camera-monitoring systems, or may enable retrofitting to a location on a vehicle not designed to support such loads.

The method in accordance with embodiments may further comprise positioning a seal around the aperture of the panel such that the first portion of the tubular body may contact the seal and the exterior surface of the panel.

In some embodiments, the at least one rib may be continuous with the first portion of the tubular body. The at least one rib may be in contact with the first portion of the tubular body. In such embodiments, the tubular body may be secured to the panel via a securing member as described above.

In alternative embodiments, the at least one rib may be discontinuous with the first portion of the tubular body, such that there may be a gap between the at least one rib and the first portion of the tubular body. The axial length of the gap may be equal to the thickness of the panel. In such embodiments, the method may further comprise inserting the second portion of the tubular body through the panel, the at least one rib mating with the at least one recess, until the panel is located between the first portion and the at least one rib.

When the panel is located between the first portion and the at least one rib, the tubular body may be free to rotate around its axis. The method may therefore further comprise rotating the tubular body such that an end of the at least one rib adjacent to the at least one recess and the at least one recess are offset, thus securing the panel against the first portion of the tubular body. The method may also comprise further securing the tubular body to the panel via a securing member as described above.

In a fourth aspect, the invention provides a vehicle comprising the apparatus as described herein.

In a fifth aspect, the invention provides a camera monitoring system for a truck comprising the apparatus as described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a an external and internal view of a vehicle camera mounting apparatus attached to a panel of a vehicle in accordance with one aspect of the present invention.

DETAILED DESCRIPTION OF EXAMPLE EMBODIMENTS OF THE INVENTION

Figure 2:
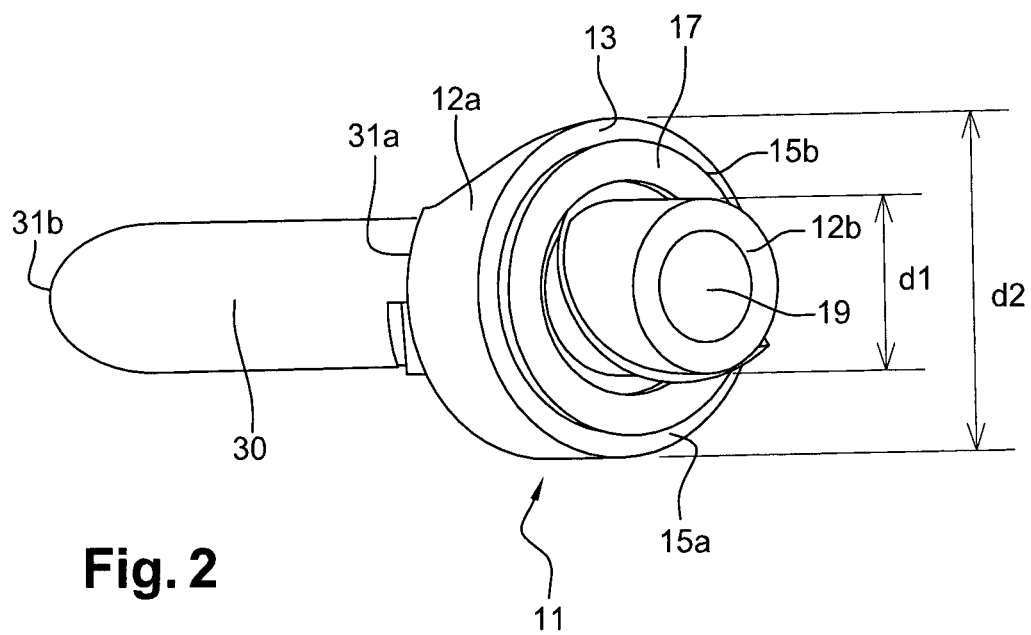
FIG. 2 is a perspective view of a vehicle camera mounting apparatus with a seal in accordance with an embodiment of the invention.

FIGS. 1a and 1b show a vehicle camera mounting apparatus 10 comprising a mount 11. The mounting apparatus 10 may be formed of many convenient materials for example a moulded plastic. The mount 11 is a cylindrically shaped tubular body and is attached to a panel 20 of a vehicle. The tubular body 11 comprises a first portion 12a and a second portion 12b. The first portion 12a and the second portion 12b may conveniently be integrally formed. As is better seen in FIG. 2, the first portion 12a has a first outer diameter d1 and the second portion has a second outer diameter d2 which is smaller than the first outer diameter, that is d2<d1. In this example, diameter d1 is approximately twice the length of diameter d2.

The tubular body 11 has a hollow passage 19 which extends through both the first portion 12a and the second portion 12b of the tubular body 11, thus defining an inner diameter. The hollow passage 19 permits, in use, access to the interior of the vehicle from the exterior of the vehicle.

The tubular body 11 extends through an aperture (not shown) in the panel 20. The panel has an interior surface 24 and an exterior surface 22. The interior surface 24 is defined as being on the inside of the vehicle and the exterior surface 22 is defined as being on the outside the vehicle. The first portion 12a of the tubular body 11 extends away from the exterior surface 22 of the panel 20, and the second portion 12b of the tubular body 11 extends through the aperture of the panel 20 and away from the interior surface 24 of the panel 20.

As shown in FIG. 1a, the first portion 12a of the tubular body 11 has a top section 14 and a bottom section 16. The bottom section 16 extends further away from the exterior surface 22 of the panel 20 than the top section 14 of the panel 20, that is the bottom section 16 is longer in length than the top section 14. The top section 14 of the first portion 12a of the tubular body 11 has a hole 18a which receives a securing member 18b, the securing member 18b in this example being a screw. The screw 18b extends through the top section 14 and engages the panel from the exterior surface 22 side, such that the first portion 12a of the tubular body 11 is attached to the panel 20.

As shown in FIG. 1b, the second portion 12b of the tubular body 11 has one helical rib 15a extending radially from an outer surface 15b. The surface of the helical rib 15a is square shaped along the length of the rib 15a. As will be shown in FIG. 3, in use the helical rib 15a mates with a complementary recess in the aperture of the panel 20. The helical rib 15a is also shown to be continuous with the sealing surface 13 of the first portion 12a of the tubular body 11.

The vehicle camera mounting apparatus 10 further comprises an elongate camera housing 30 which is attached to the first portion 12a of the tubular body 11. The camera housing 30 is hollow, and comprises a first end 31a and a second end 31b. The hollow passage 19 continues into the hollow camera housing 30 through the first end 31a to the second end 31b. The second end 31b is closed by an end wall or cap. The camera housing 30 is moveable in use between an operable and a stowable position. As such, a pivotable connection may be provided between the tubular body 11 and the camera housing 30. FIGS. 1a and 1b show the camera housing 30 in the operable position, such that the camera housing 30 is substantially perpendicular to the panel 20 and is supported by the bottom section 16. In the stowable position, the camera housing 30 is parallel to the panel 20 and sits substantially flush against the top section 14.

Attached to the interior surface 15 of the panel 20 is a reinforcement panel 40. The reinforcement panel 40 has an aperture 42 (shown in FIG. 3) and in use both the aperture of the panel 20 and the aperture 42 of the reinforcement panel 40 are aligned with each other.

FIG. 2 shows the tubular body 11 in more detail, particularly the relationship between the outer diameters d1 and d2. The larger diameter d1 of the first portion 12a of the tubular body 11 provides a sealing surface 13 which in use abuts the exterior surface 22 of the panel 20 adjacent to and surrounding the aperture. A seal 17 is attached to the sealing surface 13 and in use the seal 17 is located between the sealing surface 13 of the first portion 12a of the tubular body 11 and the exterior surface 22 of the panel 20.

Figure 3:
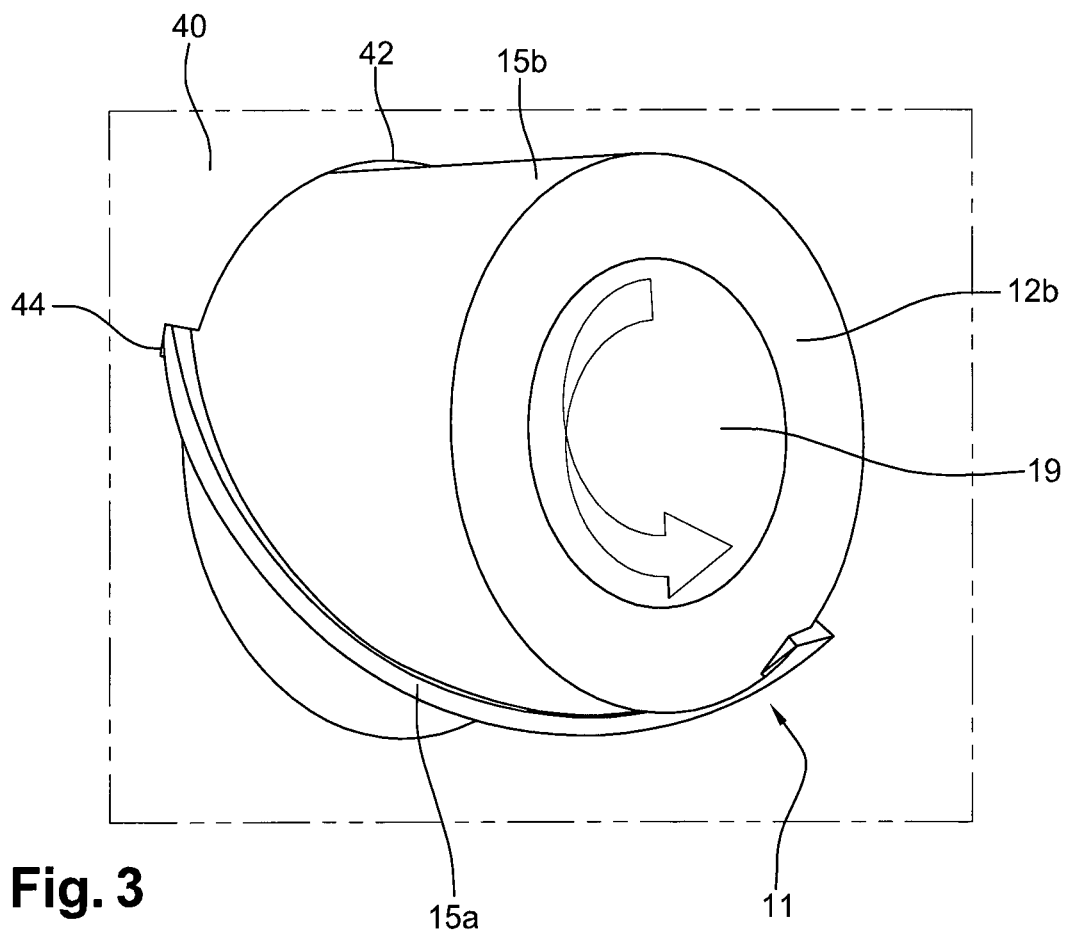
FIG. 3 is an enlarged internal view of the vehicle camera mounting apparatus and a method for attaching it to a panel of a vehicle.

FIG. 3 shows an enlarged view of the second portion 12b and the reinforcement panel 40. The reinforcement panel 40 comprises the aperture 42, the aperture 42 having a recess 44. The recess 44 is square shaped, complementing the shape of the rib 15a. The aperture formed in the panel 20 may have the same profile as the aperture 42 in the reinforcement panel 40 (but this cannot be seen in FIG. 3).

In use, the tubular body 11 is attached to the panel 20 by inserting the second portion 12b of the tubular body 11 through the aperture 42 of the reinforcement panel 40 and the aperture of the panel 20, such that the helical rib 15a mates with the recess 44 and the recess in the aperture of the panel 20. In the present example, the helical shape of the rib 15a means that the tubular body 11 rotates anti-clockwise as shown by the arrow.

In some embodiments, the seal 17 is first attached to the sealing surface 13, as shown in FIG. 2, before the tubular body 11 is attached to the panel 20. In alternative embodiments, the seal may first be placed around the aperture of the panel before the tubular body is attached to the panel.

The tubular body 11 is fully inserted through the panel 20 when the first portion 12a contacts the seal 17 (and optionally compresses the seal 17 by a desired extent) and the exterior surface 22 of the panel 20. In this position, the tubular body 11 is secured to the panel 20 by inserting a screw 18b through the hole 18a in the top section 14 of the first portion 12a of the tubular body 11.

The camera housing 30 is then moved to the operable position, such that it is substantially perpendicular to the panel 20 and is supported by the bottom section 16. In use a camera is installed within the camera housing 30. The cables and wires associated with the camera are run from the camera housing 30 through the hollow passage 19 and connected to a monitor inside the vehicle.

When not in use, for example if the truck is stopped overnight and the camera is not needed or to reduce clearance, the camera housing 30 may be moved along a folding axis parallel to the plane of the panel 20, to the stowable position. In the stowable position the camera housing 30 is parallel to the panel 20 and sits substantially flush against the top section 14.

In some embodiments, the helical rib is discontinuous with the first portion of the tubular body, such that there is a gap between the rib and the first portion of the tubular body. The width of the gap is approximately equal to the width/thickness of the panel and the reinforcement panel (if the latter is required). In such embodiments, the tubular body is fully inserted when the panel is located between the first portion and the rib. In such embodiments, the tubular body is rotated in use so that an end of the rib adjacent to the recess is offset from the recess and in this position the tubular body is secured to the panel.

Figure 4:
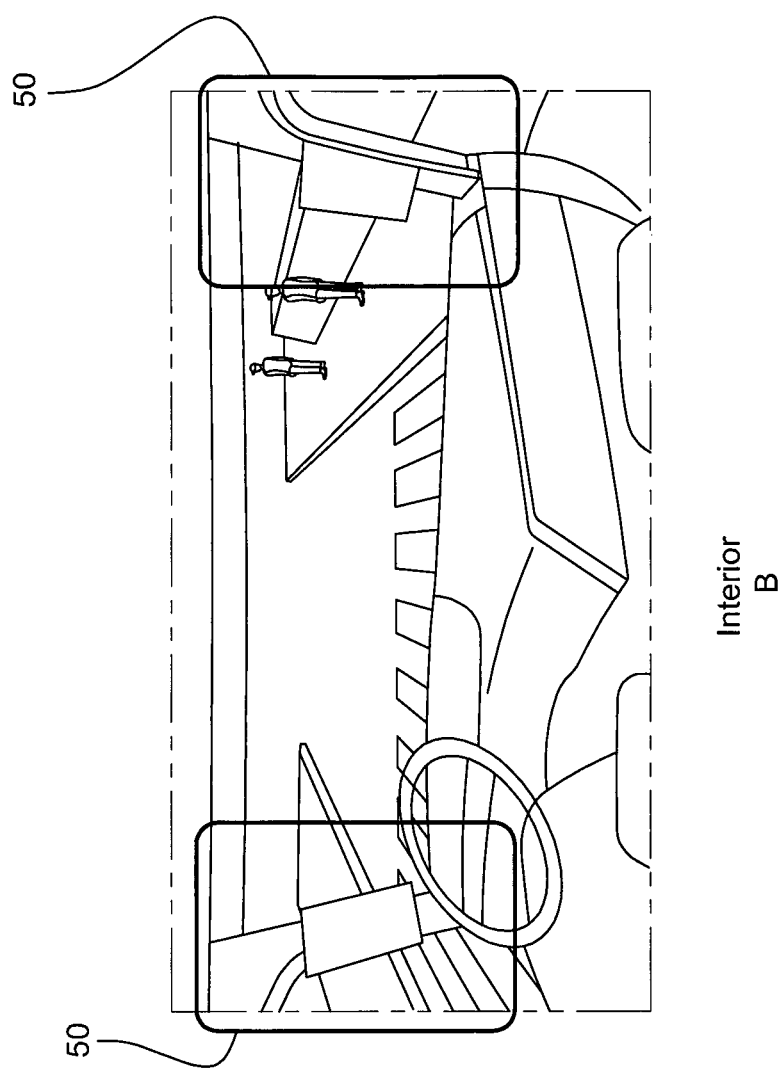
FIG. 4 is (A) a truck comprising the apparatus; and (B) the view from within the cab of the vehicle . . . .
Figure 4:
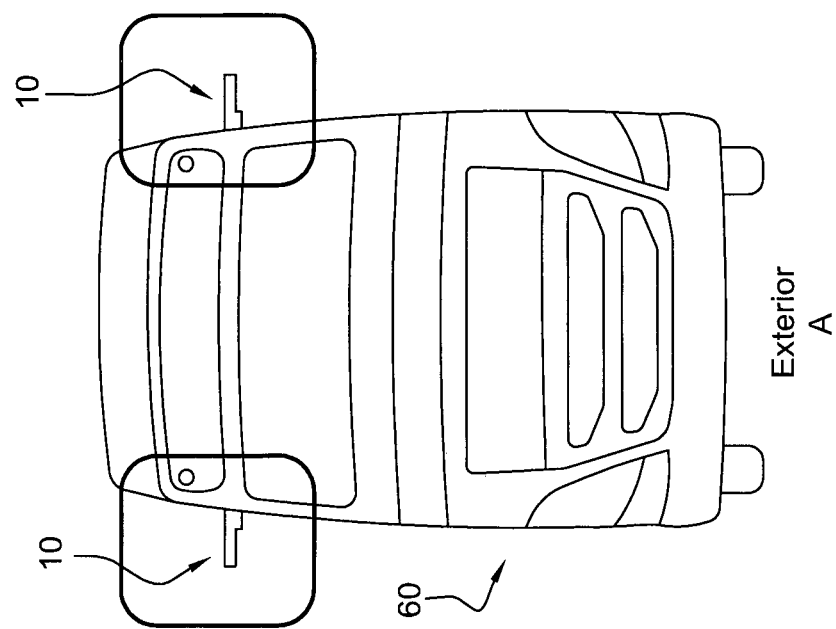

FIG. 4A shows the vehicle camera mounting apparatus 10 attached to a truck 60. The vehicle camera mounting apparatus 10 is attached to the left and the right side of the truck 60 and is used in place of conventional side view wing mirrors. The camera housing 30 contains at least one camera with a field of view covering the side of the truck 60. FIG. 4B shows monitors 50 mounted inside of a cab of the truck 60. The image produced by the at least one camera in the camera housing 30 is fed to the monitors 50 which are mounted in the direct view of the driver, thus expanding the drivers field of view around the truck 60.

It is to be understood that the present invention is not limited to the embodiments described above and illustrated in the drawings; rather, the skilled person will recognize that many changes and modifications may be made within the scope of the appended claims.

The invention claimed is:

1. A vehicle camera mounting apparatus, which is designed to be secured to a panel of a vehicle, the apparatus comprising:
   a mount, the mount comprising:
   a tubular body comprising a first portion and a second portion, the first portion having a first outer diameter and the second portion having a second outer diameter which is smaller than the first outer diameter; and
   a securing member;
   wherein the tubular body is configured to extend through an aperture in the panel of the vehicle, the panel having an interior and an exterior surface, such that in use the first portion of the tubular body extends away from the exterior surface of the panel, and the second portion of the tubular body extends through the aperture of the panel and away from the interior surface of the panel;
   wherein the first portion of the tubular body receives the securing member;
   wherein the securing member extends through the first portion of the tubular body to engage the panel from the exterior surface side, such that the tubular body is attached to the panel; and
   wherein an elongate camera housing, with at least one camera installed within the camera housing, is attached to the first portion of the tubular body.

2. An apparatus as claimed in claim 1, wherein a hollow passage extends through both the first portion and the second portion of the tubular body.

3. An apparatus as claimed in claim 2, wherein the first portion and the second portion have the same inner diameter.

4. An apparatus as claimed in claim 1, wherein the first portion of the tubular body is arranged to provide a sealing surface that abuts the exterior surface of the panel adjacent to the aperture.

5. An apparatus as claimed in claim 1, wherein the tubular body is cylindrical in shape.

6. An apparatus as claimed in claim 1, wherein the first portion comprises a top section and a bottom section, the bottom section extending further from the exterior surface than the top section.

7. An apparatus as claimed in claim 6, wherein the securing member extends through the top section to engage the panel from the exterior surface side, such that the first portion of the tubular body is attached to the panel.

8. An apparatus as claimed in claim 6, wherein the camera housing is moveable between an operable and a stowable position, such that in the operable position the camera housing is substantially perpendicular to the panel and is supported by the bottom section, and in the stowable position the camera housing is parallel to the panel and sits substantially flush against the top section.

9. An apparatus as claimed in claim 1, wherein the second portion of the tubular body comprises at least one rib extending radially from an outer surface.

10. An apparatus as claimed in claim 9, wherein the at least one rib extends helically along the outer surface.

11. An apparatus as claimed in claim 9, wherein the at least one rib extends along the outer surface parallel to the axis of the tubular body.

12. An apparatus as claimed in claim 9, wherein the at least one rib is configured to be mateable with at least one complementary recess of the aperture of the panel.

13. An apparatus as claimed in claim 1, further comprising a seal between the exterior surface of the panel and the first portion of the tubular body.

14. An apparatus as claimed in claim 1, further comprising a reinforcement panel having an aperture, wherein the reinforcement panel is secured to the interior surface of the panel such that the apertures of both the panel and the reinforcement panel are aligned with each other.

15. A vehicle camera mounting apparatus, which is designed to be secured to a panel of a vehicle, the apparatus comprising:
    a mount, the mount comprising:
    a tubular body comprising a first portion and a second portion, the first portion having a first outer diameter and the second portion having a second outer diameter which is smaller than the first outer diameter; and
    the second portion of the tubular body comprising at least one rib extending radially from an outer surface of the tubular body; wherein the at least one rib is discontinuous with the first portion of the tubular body, such that there is a gap between the at least one rib and the first portion of the tubular body;
    wherein the tubular body is configured to extend through an aperture in the panel of the vehicle, the panel having an interior and an exterior surface, such that the first portion of the tubular body extends away from the exterior surface of the panel, and the second portion of the tubular body extends through the aperture of the panel and away from the interior surface of the panel; and
    wherein the at least one rib is configured to be mateable with at least one complementary recess of the aperture of the panel, and the gap is configured to receive a portion of the panel adjacent to the aperture; and
    wherein the tubular body is rotatable relative to the panel when the gap is aligned with the panel, such that in a rotated position the at least one rib and the at least one complementary recess are offset and the tubular body is attached to the panel.

16. A method for mounting a camera to a vehicle, the method comprising:
    providing an apparatus having:
        a tubular body comprising a first portion and a second portion, the first portion having a first outer diameter and the second portion having a second outer diameter which is smaller than the first outer diameter;
        the second portion of the tubular body comprising at least one rib extending radially from an outer surface of the tubular body;
    the method further comprising:
        providing an aperture having at least one recess in a panel forming part of the vehicle, the panel comprising an exterior surface and an interior surface;
        inserting the second portion of the tubular body through the aperture of the panel, the at least one rib mating with the at least one recess, until the first portion contacts the exterior surface of the panel; and
        securing the tubular body to the panel.

17. A method as claimed in claim 16, further comprising positioning a seal around the aperture of the panel such that the first portion of the tubular body contacts the seal and the exterior surface of the panel.

18. A method as claimed in claim 16, wherein the at least one rib is discontinuous with the first portion of the tubular body, such that there is a gap between the at least one rib and the first portion of the tubular body; and wherein the method further comprises inserting the second portion of the tubular body through the panel, the at least one rib mating with the at least one recess, until the panel is located between the first portion and the at least one rib.

19. A method as claimed in claim 18, further comprising rotating the tubular body, such that the at least one rib secures the panel against the first portion of the tubular body.

* * * * *